Oct. 11, 1966 TADASHI TOMIZAWA ETAL 3,278,850

ATTENUATION CONTROL ARRANGEMENT FOR WAVE TRANSMISSION SYSTEM

Filed March 14, 1963

Inventor
T. Tomizawa -
T Kuroda
By [signature]
Attorney

United States Patent Office 3,278,850
Patented Oct. 11, 1966

3,278,850
ATTENUATION CONTROL ARRANGEMENT FOR WAVE TRANSMISSION SYSTEM

Tadashi Tomizawa and Takaji Kuroda, Minato-ku, Tokyo, Japan, assignors to Nippon Electric Company, Limited, Tokyo, Japan, a corporation of Japan
Filed Mar. 14, 1963, Ser. No. 265,243
Claims priority, application Japan, Mar. 27, 1962, 37/12,269
4 Claims. (Cl. 325—52)

This invention relates to improvements in or to wave transmission systems, such as mobile radio systems where there are a plurality of stations each having a transmitter and receiver thereat, between which stations the level of signals transmitted may vary over a wide range.

Our invention contemplates the control of the level of the signal transmitted from one station in accordance with the level of the signal received from another station in the system.

The control of signal level is particularly important in microwave mobile communications systems where overloading of receivers may occur as mobile stations come in proximity to fixed master or relay stations along the path of travel of such mobile stations. Thus, two conditions must be controlled when two stations are in close proximity, namely the receivers on each station should not be overloaded by the strong signals received from the transmitter of the other station, and the transmitted energy from at least one of such stations should be attenuated so as not to cause overload of the receiver at such other station.

In a radio communication system, electromagnetic waves which have been sent from a plurality of transmitting stations and are received at a receiving station and which are of different carrier frequencies or the same carrier frequency are modulated by the same or different information, respectively, are amplified at the receiving station with an amplifier having a broad band response, the amplifier must have a linear output characteristic over a wide range of input signal levels. If the amplifier is not linear as last mentioned, the gain of the amplifier is determined by the strongest signal, with the result that other weaker received signals either can not be amplified or are instead attenuated. It has therefore been considered impossible to realize a communication system of the kind with an amplifier which has finite linearity, or an amplifier whose linearity between the input and the output signals is retained only for the input power within a relatively narrow range.

We have invented a system which satisfies both of the aforementioned conditions, i.e. it prevents overload of the receivers in stations located near each other by too strong signals transmitted by the other station, by controlling the strength of the transmitted signal from at least one of said stations. In particular, our invention provides a simple straightforward way to control the level of the information output signal from a station in accordance with the information signal energy received by the receiver portion of said station from the other station. In our invention, we do not attempt to provide complex control arrangements to control the power supplied to the transmitter. Rather, attenuation means are provided at the transmitter output which attenutaes the output of the transmitter. The variation in attenuation provides the required changes in the information signal power radiated from the station to the other station.

The general object of the invention is to provide a transmitter-receiver wherein carrier waves which have been sent from a plurality of transmitting stations and are received at a receiving station can be amplified at the receiving station by an amplifier which is resonant to the carrier frequencies of the several transmitting stations and whose linearity between the input and the output powers holds only for a limited range of the input power.

Another object of the invention is to provide an above-mentioned transmitter-receiver for radio communication, in particular for microwave communication.

Still another object of the invention is to provide a last-mentioned transmitter-receiver for mobile communication.

According to the invention, there is provided a transmitter-receiver equipped with a transmitter part and a receiver, wherein a variable attenuator is provided between a common input and output terminal and a duplexer in such a manner that both the transmitted and the received signals may pass therethrough, the attenuation exerted by the attenuator on the received power is so controlled that the input power for the receiver may be of a predetermined level in case the received power which has reached the common input and output terminal from the participating station is stronger than the predetermined level, and by such control the power transmitted from the common input and output terminal to the participant station is so controlled that the energy which will reach the participant may be of a certain constant level in the mentioned case.

The above mentioned and other features and objects of this invention will become more apparent by reference to the following description taken in conjunction with the accompanying drawing in which.

Figures 1, 2, 3, 3A, 4:
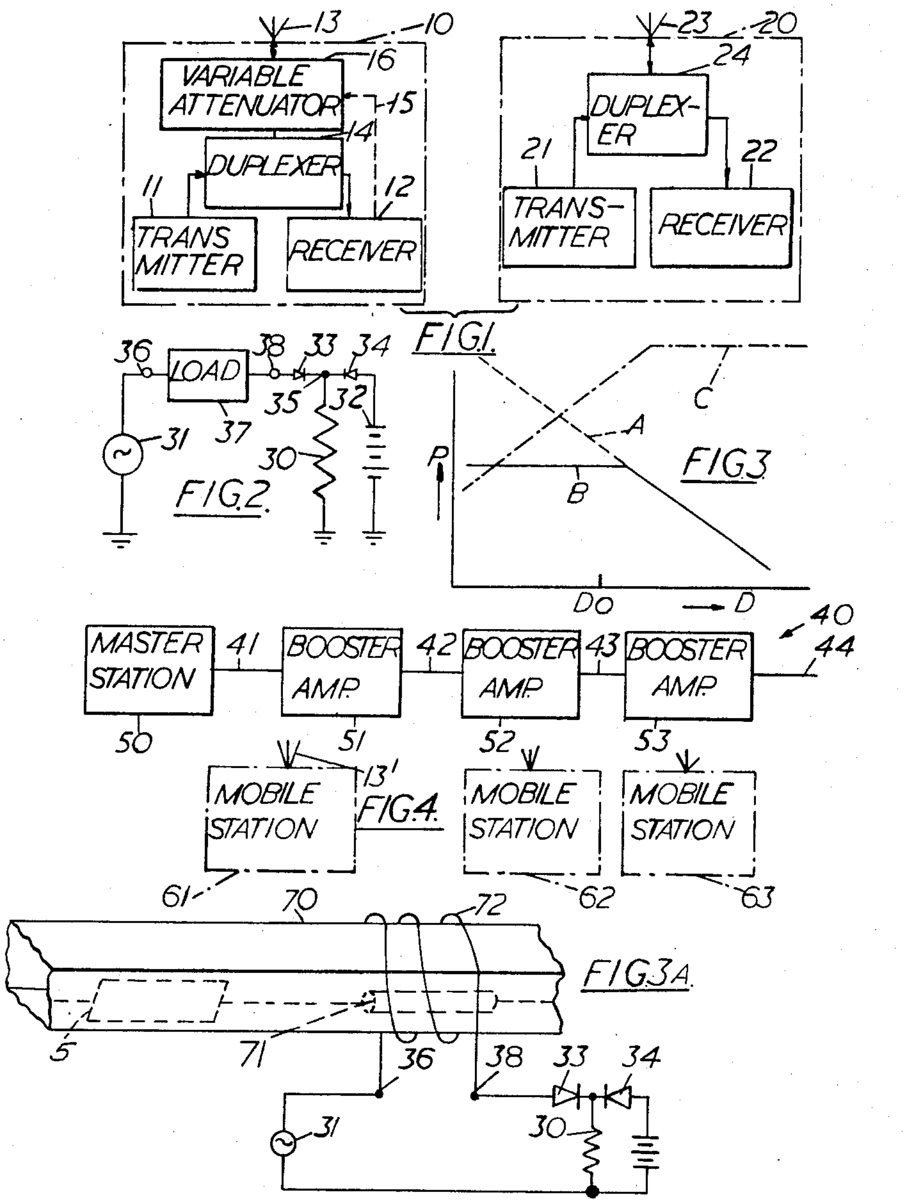
FIG. 1 is a schematic diagram in block form of an embodiment of the invention showing the structure contained in two cooperating wave transmission stations.
FIG. 2 is a schematic diagram of an arrangement adapted to control the attenuation of a variable attenuating element included in one of the stations shown in FIG. 1.
FIG. 3 is a graphic representation showing the input power to a receiver and the output power of a transmitter versus the distance between the stations shown in FIG. 1.
FIG. 3A is a schematic diagram of an actual embodiment of the control of a variable attenuating element included in one of the stations shown in FIG. 1.
FIG. 4 is a block diagram of a mobile radio communication system utilizing the invention of FIGS. 1–3A.

Referring now to FIG. 1 there is shown in block form a mobile station 10 of a microwave mobile communication system comprising a transmitter 11, a receiver 12, a radiant acting device or antenna 13, a duplexer 14 for selectively coupling the antenna 13 to the transmitter 11 and the receiver 12 so that the antenna may serve both for transmission and reception. A variable attenuator 16 is interposed intermediate the antenna 13 and the duplexer 14 so that both the transmitted and received signals may pass therethrough and whose attenuation is controlled as shown with the dashed line 15 by a portion of the output power of the receiver 12. A fixed station 20 for communicating with the mobile station 10 comprises a transmitter 21, a receiver 22, an antenna 23, and a duplexer 24 for selectively connecting the antenna 23 with the transmitter 21 and the receiver 22 so that antenna 23 may likewise be used both for signal transmission and reception. In the station 10, control of the attenuation exercised by the attenuator 16 to the signals which pass therethrough is achieved by utilizing a portion of the output signal from the receiver 12. The receiver 12 amplifies the received signal which has passed through attenuator 16 and the received signal which will reach the receiver 12 may be of a predetermined level when the amplitude of the signal received at the antenna 13 is greater than such predetermined level. In this manner, the transmitted signal sent from the transmitter 11 through the attenuator 16 to the antenna 13 is attenuated when the amplitude of the signal which reaches the fixed station 20 is larger than a certain level. This attenuation is proportional to the difference between the transmitter output power and the predetermined level, with the result that if the transmitter 11 of the mobile station 10 and the transmitter 21 of the fixed station 20 are of the same construction, the input power to the receiver 22 of the fixed station 20 is equal to that of the receiver 12 of the mobile station 10 and does not become larger than the level predetermined for the receiver 12 of the mobile station 10.

There are known attenuators such as attenuator 16. The attenuator 16 may be of the same type as the attenuator illustrated in FIG. 104, on page 773 of "Tûsin-kōgaku Handobukku (A Handbook of Communication Engineering)," compiled by Denki-tûsin Gakkai (The Institute of Electrical Communication Engineers of Japan) and published by Maruzen KK. (Maruzen Company, Limited, Japan) on July 10, 1957, a wave-guide and a resistor plate arranged to extend through the wall of the waveguide rotatably or linearly movable in parallel relation to both the electric lines of force in the waveguide and the axis thereof so that the area of the resistor plate within the waveguide may be varied. Another variable attenuator structure is shown in FIG. 106, on the same page of the last mentioned publication and comprises a waveguide and a resistor plate supported within the waveguide rotatably about the axis thereof, so that the area of the orthogonal projection of the resistor plate onto a plane which includes the axis of the waveguide and is perpendicular to the electric lines of force within the waveguide may be varied. Still another variable attenuator structure, as shown in FIG. 107, on the same page of said publication and comprises a waveguide, at least a resistor plate disposed perpendicularly to the electric lines of force within the waveguide, a ferrite rod situated along the axis of the waveguide, and a coil which is wound around the waveguide so that when the coil is energized by the passage of a current therethrough, an axial magnetic field may be produced at the location of the ferrite rod and which is arranged so that the energizing electric current may be either caused to flow or varied. A suitable arrangement for controlling, in response to a portion of the output power of the receiver 12, the attenuation exerted by attenuator 16 to microwave signals passing through a waveguide, is shown in FIG. 2 wherein there is shown a power source 31 representative of a voltage obtained from the output of receiver 12 and subsequently amplified and a second source 32 of a reference voltage, which sources are so connected through oppositely poled rectifiers 33 and 34, respectively, to a point 35 that an electric current may flow, through a common resistor 30, from the source of greatest voltage. When the source 31 provided by the receiver ouptut is of a higher voltage value than the reference voltage source 32, current may flow in a direction from terminal 36 through the load 37 to another terminal 38. The load 37 may either be a motor for giving rotational or linear movement to the resistor plate shown in FIG. 104*b* of the aforementioned publication or be the coil wound around the waveguide shown in FIG. 107 of said publication, and which produces the magnetic field at the situation of the ferrite rod. The coil is normally de-energized.

Another suitable arrangement for controlling a variable attenuator is shown in FIG. 2 and comprises a power source 31 of a voltage related to the level of the input signal to the receiver 12 and another power source 32 of a reference voltage, which sources are so connected that in case the former voltage is greater than the latter, current may flow from the source 31 through a terminal 36, the load 37, another terminal 38, and a rectifier 33 to the reference source 32. The load 37 may be the coil around the waveguide in FIG. 107 of the previously mentioned publication. It will occur to those skilled in the art that there are still other means, besides those described with reference to FIG. 2, for controlling attenuation of the attenuator 16 so that the attenuation given to the signals passing therethrough will increase when the level of the input signal to the receiver 12 is greater than the predetermined level as set by the reference voltage. By so controlling the attenuator 16, this element controls the level of the energy which passes from the duplexer 14 to the antenna 13 in FIG. 1 and if the value of such energy is greater than a predetermined level, the energy reaching the receiver 12 also decreases to the predetermined level.

Referring now to FIG. 3 there is shown a graph wherein the abscissa is logarithmically calibrated representing distance D between a mobile station 10 and a fixed station 20 and the ordinate is the input signal P in decibels to a receiver 12 or 22 of the mobile or fixed stations 10 or 20 and also output power of a transmitter 11 of the mobile station 10. It will be observed that the received power which is proportional to the inverse square of the distance D, decreases with a conventional transmitter-receiver in the manner shown by the dashed line curve A, whereas the input signal levels of the receiver 12 or 22 of the mobile or fixed station 10 or 20 does not exceed, according to the invention, a predetermined level such as, for example, —40 dbm as shown by the solid line curve B. Also, the transmitted power from the mobile station 10 in which the variable attenuator 16 is provided, undergoes more attenuation for a smaller distance D in case the distance is smaller than a certain distance $D_0$, as shown by a dot-dash line curve C, with the result that the level of the signal received by the participating fixed station 20 is not greater than —40 dbm even in case the distance D is smaller than the particular distance $D_0$.

Referring now to FIG. 3A, there is shown schematically an actual embodiment of the invention wherein the circuit structure is identical to FIG. 2 with the exception that the load is now shown to be a portion of a waveguide 70 having a ferrite rod 71 and resistor plate 5 therein and a winding 72 around the outside of the guide in the proximity of the rod 71. The details of the waveguide 70, the ferrite rod 71 and the widing 72 are to be found in FIG. 107 of the above-identified handbook. The operation of this embodiment is the same as that described for FIG. 2.

Referring finally to FIG. 4, there is shown schematically a fixed communication system 40 of a mobile radio communication system comprising a series of transmission lines 41, 42, 43, 44, . . . such as open coaxial lines, twin-lead type feeders, or Goubeaux lines, which transmit high-frequency electromagnetic waves while slightly radiating the electromagnetic waves, a master station 50, booster amplifiers 51, 52, 53 . . . connected in series together with the master station 50 by the transmission lines. The electromagnetic wave energy radiated along the transmission lines, 41, 42, 43, 44, is mainly directed perpendicularly away from the transmission lines. Such transmission lines also act as receiving antennas to pick up any signal which has reached any point along said lines. A mobile station 61 travelling adjacent the fixed communication system 40 is comprised of the same elements as the mobile station 10 shown in FIG. 1 except that its antenna 13′ has directivity in the direction of a perpendicular from the mobile station 61 to the fixed communication system 40. Other mobile stations 62, 63, . . . similar to the mobile station 61 may also be arranged along a path substantially parallel to the fixed communication system 40. An electromagnetic wave signal emitted from a specific point along transmission lines 41–44 is picked up by the antenna 13′ and is received by the mobile station 61 in the manner explained with reference to FIG. 1. The electromagnetic wave sent out from the mobile station 61 is picked up by the transmission lines at the neighborhood of a point therealong perpendicular to the mobile station 61 and is sent, together with other electromagnetic waves, if any, sent out from any of the other mobile stations 62, 63 . . . to the master station 50 while amplified by the booster amplifiers. At each of the booster amplifiers, the input levels of the electromagnetic waves applied thereto and received from the plurality of mobile stations 61, 62, 63 . . . would be considerably different from the input level at the other booster amplifier, if the invention is not carried into effect in the mobile stations 61, 62, 63, . . . . It is, however, possible with the mobile stations 61, 62, 63, . . . in which the invention is carried into effect, to amplify without any trouble such electromagnetic waves because the electromagnetic waves transmitted from the respective mobile stations 61, 62, 63, . . . are controlled by the variable attenuators 16 therein, when the signals which are transmitted from the transmission lines to any of the mobile stations and are supplied to the receiver 12, are stronger than a predetermined level.

The invention can also be carried into effect in an ordinary mobile communication system for communication between a fixed communication system comprising a master station and a plurality of auxiliary stations connected instead of the above-mentioned transmission lines by wire or by radio and one or more mobile stations installed on vehicles such as automobiles, by providing each mobile station having a transmitter unit with a variable attenuator and means for controlling the attenuation given by the attenuator to the transmitter power and the received power which pass therethrough so that the received power which would reach the receiver part through the attenuator, if such power is stronger than a predetermined level, may be reduced to the predetermined level.

While the invention has so far been explained in conjunction with its application to a mobile communication system and with an embodiment wherein the variable attenuator and the afore-mentioned controlling means are provided in the mobile stations, the variable attenuator and the controlling means therefor may be positioned in the fixed stations particularly in case signals from a plurality of fixed stations are amplified in a mobile station by an amplifier which is common to the signals. Although only a variable attenuator comprising waveguide has been described, it will be easy for this skilled in the art to adopt a variable attenuator of the other type in accordance with the frequency range of both the carrier waves employed and the signals.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A communication system having at least two stations in which information signals are to be transmitted in both directions between said stations, each station comprising: a radiant device for radiating and receiving information signals; a duplexer connected to receive signals from and to supply signals to said radiant device; a transmitter for providing information signal to be transmitted and a receiver connected to said duplexer, said duplexer selectively supplying the received signals to said receiver and the information signals from said transmitter to said radiant device; at least one of said stations further comprising means in said receiver for generating a receiver output signal indicative of the energy contained in the received signals, settable variable attenuator means connected between said radiant device and said duplexer and level control means responsive to said receiver output signal and connected to said variable attenuator means for setting said variable attenuating means to attenuate the information signals from the transmitter thereof, in accordance with said receiver output signal whereby the information signals supplied from said station will be attenuated in accordance with the energy of the just received signals.

2. In a system as claimed in claim 1, wherein said variable attenuating means comprises a section of waveguide, a paramagnetic element within said waveguide, a resistive plate in said waveguide coupled to said element, and an electric winding disposed around the exterior of said waveguide, said winding adapted to be coupled intermediate said receiver output and said level control means.

3. In an improved mobile communication system having at least one fixed and one mobile station which exchange information signals, each station including a transmitter for supplying information signals to be transmitted and a receiver coupled to an antenna through a duplexer which selectively supplies the received information signals to said receiver and supplies the signals from said transmitter to said antenna, the improvement comprising, in at least one of said stations, means in the receiver for producing a receiver output signal indicative of the energy of the received signals; settable variable attenuator means connected between the antenna and said duplexer; and level control means responsive to said receiver output signals, connected to said variable attenuator means for setting said attenuator means to attenuate the information signals to be transmitted by the transmitter thereof in accordance with said receiver output signal whereby the signals transmitted from said station will be attenuated in accordance with the energy of the just received signals.

4. A wave energy communication system having a plurality of fixed stations, each spaced from the other along a path, at least one mobile station adapted to communication with different ones of said fixed stations as it progresses along said path, both said fixed and said mobile stations each comprising a radiant device, a duplexer connected to receive signals from and to supply signals to said radiant device; a transmitter for producing information signals to be transmitted and a receiver connected to said duplexer, said duplexer selectively supplying the received signals to the receiver and the information signals from said transmitter to said radiant device, said mobile station further comprising settable variable attenuator means connected between said radiant device and said duplexer, means in said receiver for producing a receiver output signal indicative of the energy contained in the received signals, and level control means responsive to said receiver output signals and connected to said attenuator means for setting the attenuator means to attenuate the information signals to be transmitted from the transmitter in accordance with said receiver output signals whereby the information signals radiated from said station will be attenuated in accordance with the energy of the just received signals.

References Cited by the Examiner

UNITED STATES PATENTS

| | | | |
|---|---|---|---|
| 2,629,079 | 2/1953 | Miller et al. | 333—81 |
| 2,678,998 | 5/1954 | Young | 325—53 |
| 2,981,943 | 4/1961 | Dodington | 343—7.5 |
| 3,027,466 | 3/1962 | Roalef | 307—88.5 |
| 3,151,295 | 9/1964 | Haviland | 325—4 |

DAVID G. REDINBAUGH, *Primary Examiner*.

B. V. SAFOUREK, *Assistant Examiner*.